Patented Nov. 4, 1924.

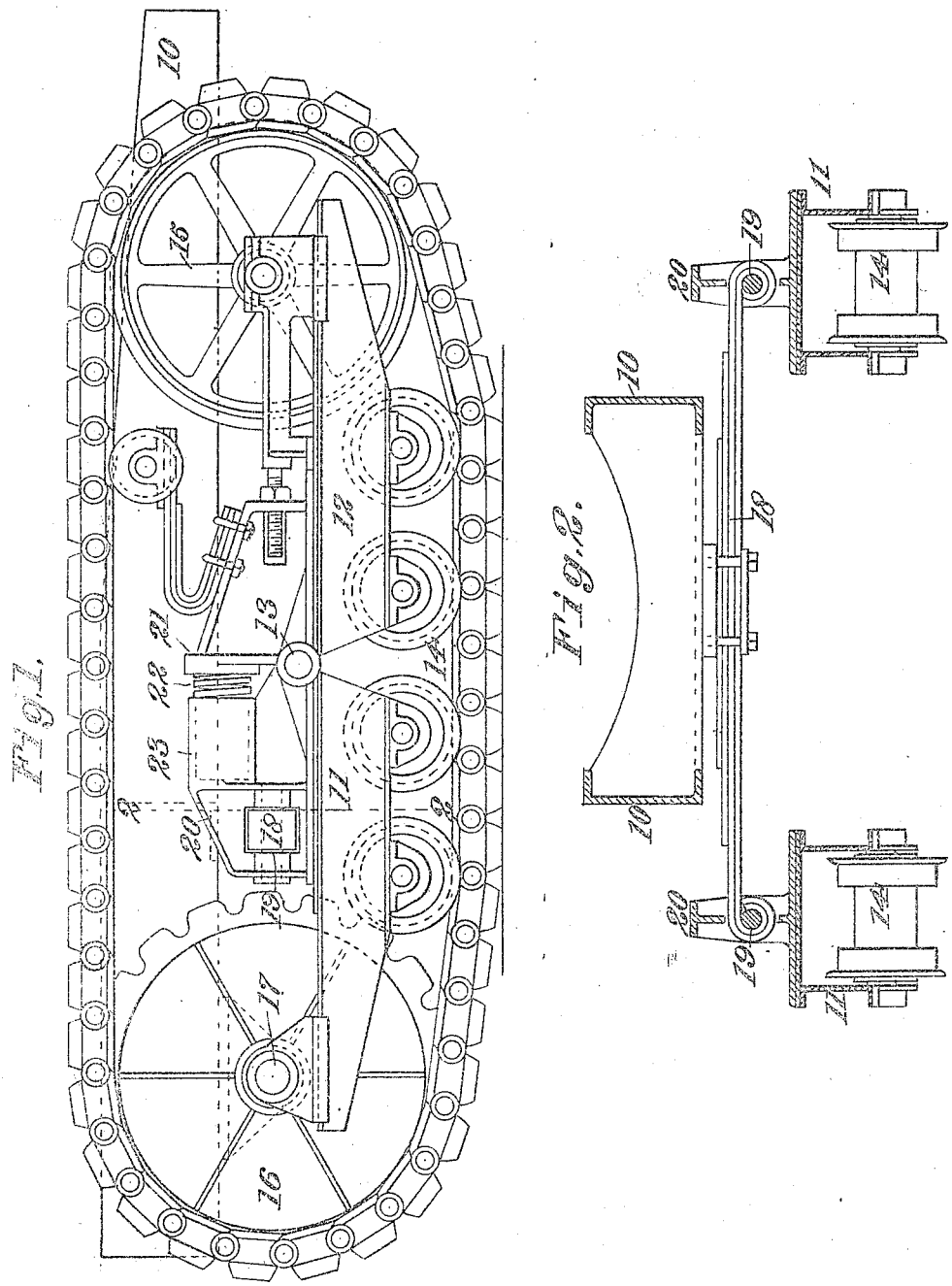

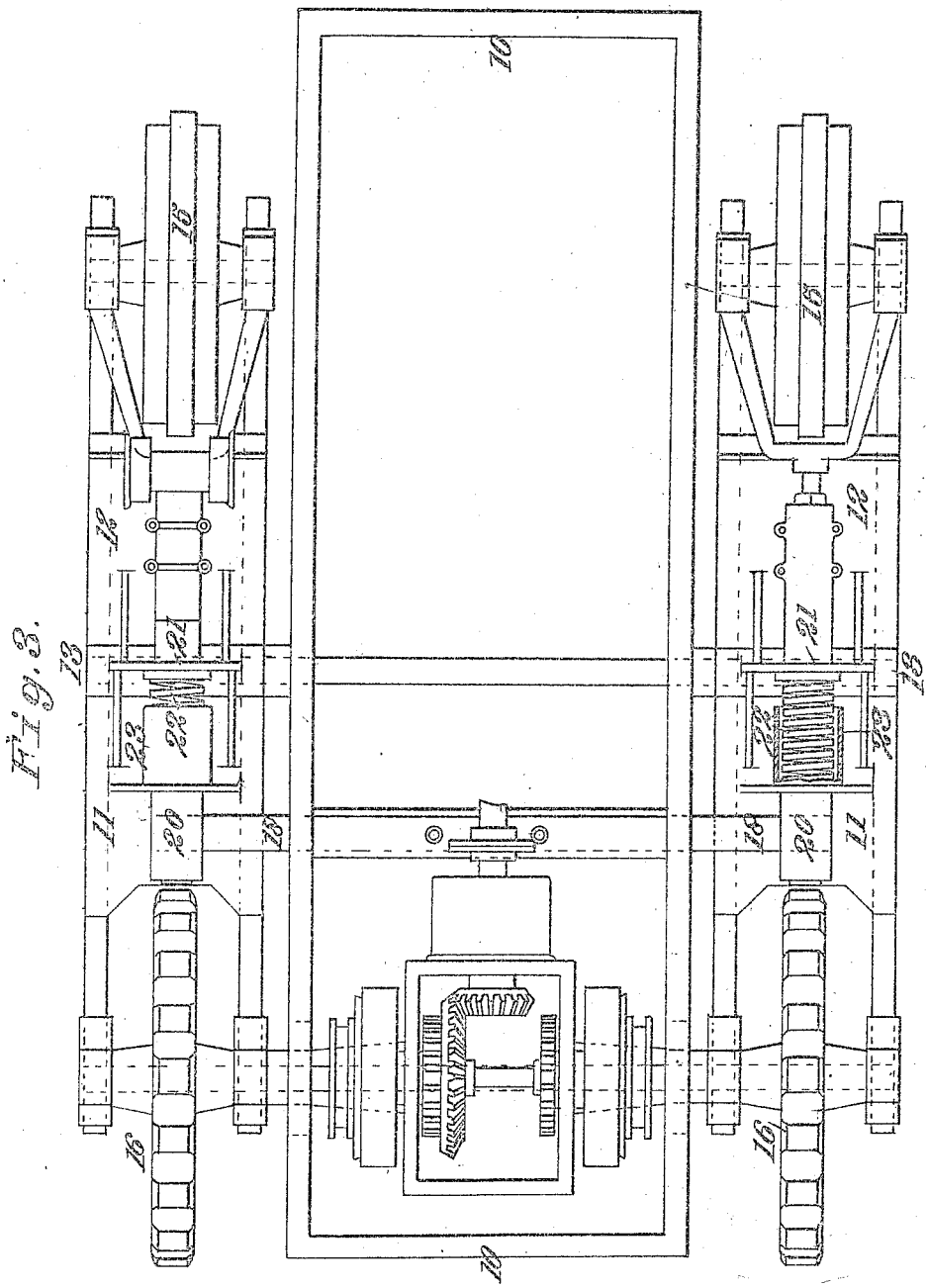

1,514,188

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

TRACTOR-FRAME SUSPENSION.

Application filed September 29, 1919. Serial No. 327,286.

*To all whom it may concern:*

Be it known that I, ELMER E. WICKERSHAM, a citizen of the United States, residing at Stockton, in the county of San Joaquin and State of California, have invented new and useful Improvements in Tractor-Frame Suspensions, of which the following is a specification.

This invention relates to tractors of the chain track type, and more particularly to suspension means for the main frame.

In my prior application, Serial No. 314-205, filed July 30th, 1919, I show and describe means for supporting the entire weight of the main frame at a single point on each of the truck mechanisms. The present application relates to the same general system of suspension wherein I have adapted this system of suspension to an articulated truck mechanism and also substituted a spring bar for the rigid axle of the prior device.

Referring to the accompanying drawings:

Fig. 1 shows a side elevation of a device embodying my invention.

Fig. 2 shows a cross-sectional view of the same taken on the line 2—2 of Fig. 1.

Fig. 3 shows a plan view of the device shown in Fig. 1.

The main frame of the tractor is indicated at 10, and at each side thereof is a self-laying track truck mechanism comprising a roller frame made in two sections 11 and 12 hinged together at 13. One or more rollers 14 is journaled on each of these truck frame sections and the forward section carries an idler sprocket wheel 15. The rear section has journaled upon it the driving sprocket wheel 16, the drive shaft 17 of which is also journaled on the main frame.

For supporting the main frame upon the truck mechanisms I provide a laminated leaf spring 18 connected at its central portion to the main frame and extending transversely thereof and pivotally connected at each end to the adjacent truck mechanism by means of a pivot 19 carried upon a bracket 20 formed on the rear truck section. Extending vertically from the hinge bearing of each forward truck section is an arm or bracket 21 against which presses a coiled spring 22. This coiled spring is carried in a housing 23 formed on the bracket 20 of the rear truck section. The purpose of the coiled spring is to exert a forward pressure on the arm 21 of the front truck section whereby to maintain the latter in contact with the ground and distribute the weight of the main frame thereon.

In the operation of the suspension mechanism shown and described the major portion of the weight of the main frame is supported by the leaf spring 18 and is transmitted thereby to the pivot 19 on the rear truck sections and distributed to the forward truck sections by the spring connection 22. Any tendency of the main frame to tilt downwardly at the front is restrained by reason of the fact that the driving sprocket wheels are connected both to the main frame and to the roller truck frames, and thereby there is a tendency for the rear truck sections to be raised slightly at their rear. They are restrained in this movement by reason of the springs 22 interposed between the front and rear truck sections. The truck sections are free to move about their hinged connection and thereby to conform to irregularities in the surface of the roadway. The main frame is cushioned on account of the spring 18 and also the truck mechanism, as a whole, may rock about the axis of the drive shaft 17, the spring 18, yielding to permit this.

Having thus described my invention, what I claim and desire to secure by Letters Patent is:

1. In a vehicle, a main frame, a truck mechanism at each side thereof comprising hinged roller truck sections, an idler wheel on the front section, a driving sprocket wheel on the rear section, said driving sprocket wheel having a shaft journaled on the main frame and on the rear truck section, load-supporting means centrally connected to the main frame having a single point of connection with each truck mechanism located on the rear truck section and spring means interposed between the two truck sections to distribute the load.

2. In a vehicle a main frame, a truck mechanism arranged on each side thereof and each truck comprising front and rear hingedly connected sections, an idler wheel journaled on each front section, a driving sprocket wheel on each rear section, said driving sprocket wheels being secured to a shaft which is journaled on the main frame and on each rear truck section, said shaft forming a pivotal point about which the rear truck sections swing, a load supporting spring disposed transversely of the main frame and centrally connected thereto, the outer ends of said spring being secured to the rear trucks forward of the sprocket driving shaft, and means interposed between the front and rear sections of each truck to distribute a portion of the load to the forward truck sections.

3. In a vehicle a main frame, a truck mechanism arranged on each side thereof and each truck comprising front and rear hingedly connected sections, an idler wheel journaled on each front section, a driving sprocket wheel on each rear section, said driving sprocket wheels being secured to a shaft which is journaled on the main frame and on each rear truck section, said shaft forming a pivotal point about which the rear truck sections swing, a load supporting spring disposed transversely of the main frame and centrally connected thereto, the outer ends of said spring being secured to the rear trucks forward of the sprocket driving shaft, a pair of brackets secured one on the front and one on the rear section of each truck, and a spring interposed between the brackets to distribute a portion of the load to the forward truck sections.

In testimony whereof I have hereunto set my hand in the presence of two subscribing witnesses.

ELMER E. WICKERSHAM

Witnesses:
 GLADYS SCHERMERHORN,
 IRENE BUGBEE.